United States Patent [19]
Ali et al.

[11] Patent Number: 5,896,506
[45] Date of Patent: Apr. 20, 1999

[54] DISTRIBUTED STORAGE MANAGEMENT SYSTEM HAVING A CACHE SERVER AND METHOD THEREFOR

[75] Inventors: Seifu Ali, Santa Clara, Calif.; Thomas G. Burket, Potomac, Md.; Tawei Hu, San Jose, Calif.; Gerald Edward Kozina, Cupertino, Calif.; Thomas S. Lee, San Jose, Calif.

[73] Assignee: International Business Machines Corporation, Armonk, N.Y.

[21] Appl. No.: 08/656,441

[22] Filed: May 31, 1996

[51] Int. Cl.⁶ .................. G06F 13/38; G06F 15/17
[52] U.S. Cl. .................. 395/200.43; 395/200.46
[58] Field of Search .................. 707/1, 10, 9, 200, 707/2; 395/200.31, 200.49, 200.38, 200.46, 200.43; 711/138, 130

[56] References Cited

U.S. PATENT DOCUMENTS

| | | |
|---|---|---|
| 3,569,938 | 3/1971 | Eden et al. |
| 4,942,518 | 7/1990 | Weatherford et al. ............ 364/200 |
| 4,972,367 | 11/1990 | Burke . |
| 5,058,185 | 10/1991 | Morris et al. |
| 5,161,214 | 11/1992 | Addink et al. |
| 5,201,041 | 4/1993 | Bohner et al. ............ 395/425 |
| 5,214,768 | 5/1993 | Martin et al. |
| 5,263,136 | 11/1993 | DeAguiar et al. |
| 5,367,698 | 11/1994 | Webber et al. |
| 5,412,791 | 5/1995 | Martin et al. |
| 5,414,844 | 5/1995 | Wang . |
| 5,442,749 | 8/1995 | Northcutt et al. |
| 5,495,607 | 2/1996 | Pisello et al. |
| 5,504,873 | 4/1996 | Marting et al. |
| 5,508,732 | 4/1996 | Bottomley et al. |
| 5,511,208 | 4/1996 | Boyles et al. |
| 5,568,181 | 10/1996 | Greenwood et al. |
| 5,649,185 | 7/1997 | Antognini et al. |

OTHER PUBLICATIONS

Nayfeh, Exploring the Design Space for a Shared–Cache Multiprocessor, 1994.
IBM Technical Dislosure Bulletin, F.J. Affinito and P. L. Rosenfeld, "Prefetch Cache for Data Search with Limited Multiple–Porting", vol. 27, No. 7A, Dec. 1984.

*Primary Examiner*—Mark H. Rinehart
*Attorney, Agent, or Firm*—Sughrue, Mion, Zinn, Macpeak & Seas, PLLC

[57] ABSTRACT

The present invention is directed to a method and system for storing and managing objects, such as binary large objects (blobs) in a digital library system which includes a plurality of clients, an object server for storing an object, a cache server for storing a copy of the object, and a centralized server for storing information identifying the object as being stored in the object server and associating one or more of the clients with the cache server, in which one of the clients, as a requesting client, requests retrieval of an object, a copy of the requested object is sent from the cache server to the requesting client if the object is stored in said cache server, and a copy of said object is sent from the object server to said requesting client if the object is not stored in the cache server; and a copy of the requested object is sent from the object server to the cache server after the object server sends the object to the client, in which the object sent to the client is made available to the client regardless of whether sending of the copy of the object to the cache server is completed.

18 Claims, 8 Drawing Sheets

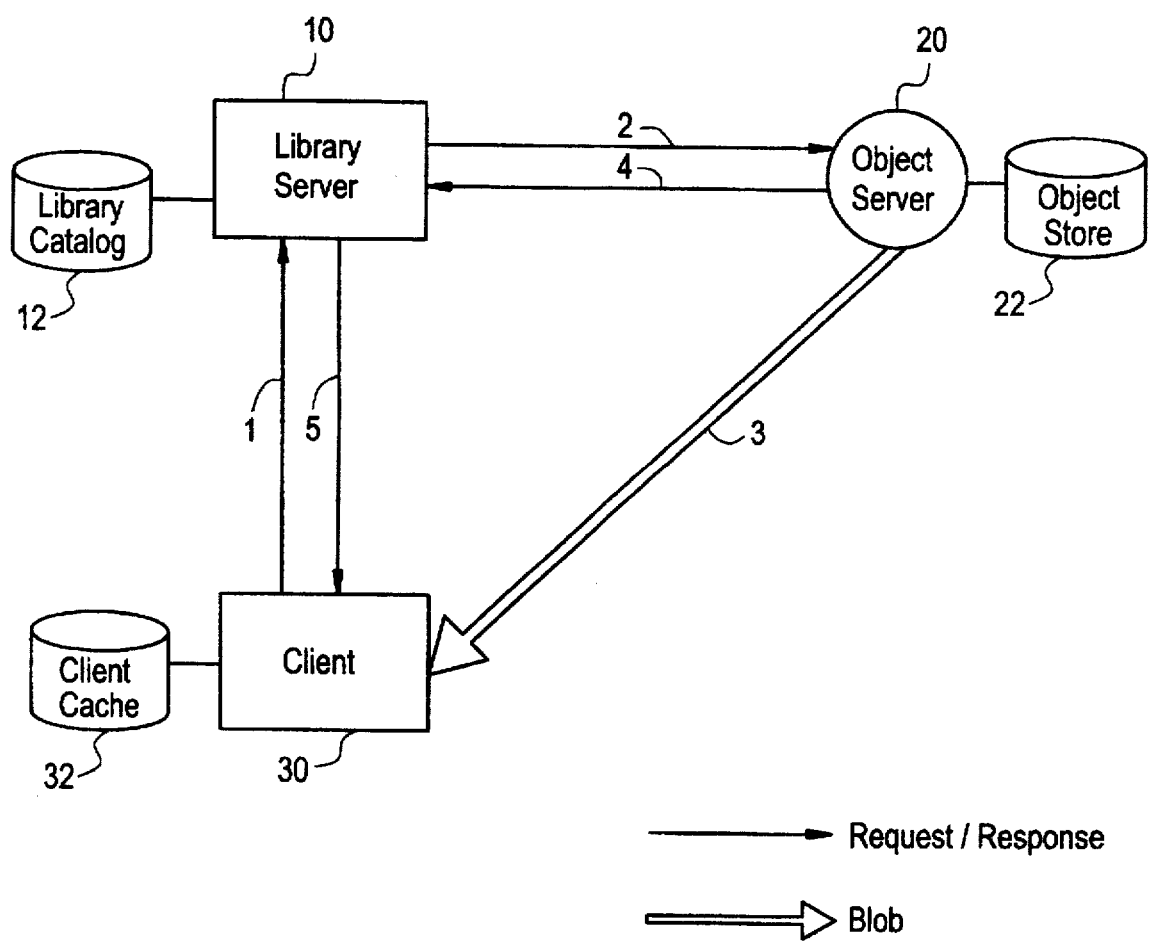

DISTRIBUTED STORAGE MANAGEMENT SYSTEM HAVING A CACHE SERVER AND METHOD THEREFOR

BACKGROUND OF THE INVENTION

1. Field of the Invention

This invention is related to the field of distributed storage management. In particular, it relates to a method and apparatus for storing objects in a local object store, or cache, for use by one or more local users or clients in a client/server environment.

2. Description of the Related Art

Client/server object storage systems have been used to store and manage a wide variety of digital objects such as documents, graphics, audio, video, spread sheets and word-processing text. Such digital objects are known generally as binary large objects (blobs). The IBM IMAGEPLUS VISUALINFO product provides such capabilities.

A conceptual view of the client/server relationship in IBM's IMAGEPLUS VISUALINFO is shown in FIG. 1 and includes a library server 10, one or more object servers 20 and a library client 30. Each of the library and object servers and the client includes an information store. That is, the library server 10 includes a library catalog 12, the object server 20 includes an object store 22 and the library client 30 includes a client cache 32, as shown in FIG. 3. Also, a communications isolator (not shown) is included which allows the library server, object server and library client to communicate with one another without concern for complex communications protocols. The library server, object servers and clients are connected by a communications network, such as a wide-area network (WAN).

The library clients 30 each send requests to the library server 10 to store, retrieve, and update objects stored in object servers 20, and to update and query the object indexes and descriptive information stored in library catalog 12. Library client requests are generated by library patrons. These patrons are users who have been granted privileges for the use of the library system.

Two types of library servers have been used, a host based library server (HBLS) and a LAN based library server (LBLS). The HBLS, is a program that can be implemented in a mainframe computer in an IBM MVS/ESA environment running under CICS. The library catalog that it interacts with can be implemented with an IBM DATABASE 2 (DB2) database.

The LBLS is a program implemented in a workstation environment, such as under the IBM OS/2 operating system. The library catalog with which it interacts can be implemented using an IBM OS/2 D32 database.

Before a library client request is processed, library server 10 checks library catalog 12 to ensure that the patron's name and password are valid. Next, the library server ensures that the patron has been granted the appropriate privileges to perform the requested action. Each patron is assigned a set of privileges by a system administrator. An example of a library privilege is the ability to delete objects.

Finally, the library server checks to ensure that the object's owner has granted the patron the privileges needed to do what is requested (e.g., update the object). The owner of an object is the patron who first stored the object. When an owner stores an object that owner must specify which other patrons are to have access to the object.

Objects stored in the library system can be checked out by a patron for a specified period of time. This feature can be used to ensure that one patron's updates to an object are not overwritten by another. While an object is checked out by a patron, other patrons can retrieve the object and view it, but they cannot update it. In typical implementations, there are groups of individuals who need access to the same objects. Therefore, to simplify the process of granting access to objects, a system administrator can define patrons as members of a group. When a patron is defined as a member of a group, that patron is able to access any object for which the group has been granted privileges. Additionally, patrons can access objects for which they have been specifically granted individual privileges. A patron can set default groups whose members will have access to the objects the patron stores. When patrons store objects, they have the option to use this default group, to grant specific privileges to groups and individual patrons, or to do both.

If a library client request involves the storage, retrieval, or update of an object, library server 10 forwards the request to the object server 20 that contains or will store the object(s) referred to in the request based upon information provided by library catalog 12. If the library client request is a query of the information stored in library catalog 12, library server 10 will interact only with library catalog 12 and will not contact object server 20.

The library catalog is analogous to a conventional library's card catalog. It is a single set of database tables which contain an index of all the objects stored in the library system. In addition, it can store information such as textual descriptions for each object, information on the type of object (e.g., image object, spreadsheet, text document), library patron names and privileges, access authorization data for each object, links between objects. The library catalog can also store a virtually unlimited number of property type/property value pairs for each object (e.g., name/John, Age/35, Address/1 Greenway Drive). These property type/property value pairs are known as an object's properties.

An object server 20 maintains objects stored within the library system. Objects are stored or retrieved from an object store 22 by object server 20. Object server 20 receives requests from library server 10 and communicates with library client 30 to complete the requests. Such a library system can contain several distributed object servers.

Two types of object servers have been used, a host based object server (HBOS) and a LAN based object server (LBOS). The HBOS is a program implemented on a mainframe computer, for example in a MVS/ESA environment running under CICS. It interacts with the IBM Object Access Method (OAM) to provide object storage. The LBOS is a program implemented in a workstation, such as in an OS/2 environment, and provides object storage on a local area network (LAN).

When a library patrons's privileges are defined a default object server can be set for the patron. When a patron stores an object, it will be stored in the default object server for that patron. If it is later determined that an object or a group of objects should be relocated to a different object server, a client application can move the objects from one object server to another. Also, a system managed storage method, such as that disclosed in a U.S. patent application Ser. No. 08/036,305 filed Mar. 24, 1993 and assigned to IBM Corporation (BT992063), entitled "A Method And System For Parallel, System Managed Storage For Objects On Multiple Servers" by T. G. Burket et al. which is incorporated herein by reference, provides a means for moving an object from one object server to another.

An LBOS can be located on any workstation having sufficient hardware resources and is connected to the library server. Furthermore, LBOS can be located at a site remote from the library server and local to the user. This allows selected objects to be stored close to a remote group of library patrons who will frequently use these objects. This capability is called distributed object storage. Distributed object storage helps to reduce the costs associated with sending objects over communications lines and provides better performance in storing and retrieving objects.

The HBOS interacts with the IBM OAM to implement an object store that is maintained as a set of IBM DB2 tables. These DB2 tables can be monitored, backed up, and recovered using standard DB2 utilities. OAM is capable of managing its information store using a combination of direct access storage devices (DASD) and write once read many (WORM) optical storage.

LBOS implements its object store by using a combination of the LBOS workstation hard drives and an optional optical library subsystem (often called an optical jukebox). The optical library supported by LBOS is capable of storing optical cartridges internally. Shelf-resident optical cartridge support is also provided, thus greatly expanding the storage capacity of the optical server. LBOS controls the migration of objects between the workstation hard drive, which functions as a staging area, and optical storage. Because a workstation's hard drive can access stored information faster than an optical jukebox, LBOS ensures that newly stored objects and objects that have recently been retrieved are maintained on the workstation hard drive. As the workstation hard drive becomes full, LBOS removes those objects to optical storage that has been least recently accessed to free storage space for new objects. A single drive optical drive can also be attached to LBOS to provide a transaction log as a backup mechanism for the optical library.

LBOS includes a variety of storage administration functions, such as transaction logging and the ability to write out duplicate copies of images and files to support full backup and recovery.

The library client 30 is the interface through which application programs can submit requests to the library system. These can include requests to store objects, update/add descriptors to objects, delete objects and query information in the library catalog. Library requests can be submitted through the library client either individually or in batches.

The client cache 32 is a specialized function, implemented on a user's workstation. The cache is used to locally hold copies of objects that have been stored to or retrieved from the object server. These local copies allow very fast access to objects. When a copy of an object is retrieved from the library system, it is stored in client cache 32 of the requesting library client 30. When library request orders are submitted by library client 30 to library server 10 a copy of the request is also stored in client cache 32.

FIG. 3 illustrates the data flow in a conventional digital client/server library system. A client, such as client 30, can be located remotely from the library server 10 and object server 20. Typically, the client 30 is connected to library server 10 and object server 20 via a wide-area network (WAN). Moreover, object server 20 may be connected to library server 10 via a WAN.

When a requesting client 30 requests an object, or binary large object (blob), it sends a request 1 to library server 10. Upon receipt of the request, library server 10 determines, after consulting library catalog 12, the object server which owns and stores the requested object. Here, the owning object server is shown as object server 20, to which library server 10 issues a request 2. Upon receiving the request 2, object server 20 retrieves the blob from object store 22 and sends a copy of it to client 30. The double line 3 shown in FIG. 3 identifies a copy of the blob which is transmitted from object server 20 to requesting client 30. Object server 20 stores the blob in client cache 32. When the blob is successfully transmitted to client cache 32 object server 20 sends a response 4 to library server 10 upon successful transfer of the blob to client cache 32. Library server 10, in turn, sends a response 5 to requesting client 30 indicating to the client that the blob was successfully transferred, which allows the client to retrieve the blob from client cache 32 for use by a client application.

SUMMARY OF THE INVENTION

It is an object of the present invention to solve the problems described above of consuming enormous amounts of network resources while storing objects in a centralized server for backup and security while making those objects available to users located over a wide geographical area.

It is another object of the present invention to store objects in a centralized server for backup and security while making those objects available to users located over a wide geographical area and avoiding unnecessary delay in response time.

It is yet another object of the present invention to store objects in a centralized server for backup and security while making those objects available to users located over a wide geographical area and avoiding the need of requiring a cache in a client workstation.

The present invention addresses the need to have a centralized server store objects, but eliminates the need for each client to access this centralized server, which can be on a wide-area network (WAN), to retrieve an object and keep a copy of it on its local client cache. The present invention generally operates as follows:

1) When a retrieve request from a requesting client is processed for an object located on a remote archive object server, a copy of the object is copied to the cache server so that any subsequent request by any of the clients serviced by that cache server are satisfied by that cache server. These other clients preferably are connected to the same local area network (LAN) as the requesting client. The present invention significantly reduces the cost associated with transmitting an object, or binary large object (blob), over the WAN to retrieve the same blob for a plurality of clients, and it greatly improves response time.

2) The present invention also pre-fetches objects to the cache server if it is anticipated that they will be requested for retrieval in the near future. The present invention allows for planning ahead and populating the cache server during off-hours when the traffic and cost for the network are more favorable for the site at which the cache server is located. The present invention is important since a digital client/server library system may have multiple sites each with its own cache server, but all with each site accessing a centralized object server. By allowing a cache server to be populated prior to when objects are needed, the invention allows network usage to be maximized and avoids contention for access to the centralized server.

3) The present invention also allows a system administrator to enable or disable a client cache 32 to save disk space. For example, if 200 clients are connected to a LAN, only one copy of an object needs to be stored on the cache server servicing those clients, rather than having copies of the same object sent to each of the clients.

4) The present invention also allows the cache server to be turned on and off across the entire digital client/server library system or by each site. Accordingly, a system administrator can remove a specific cache server without impacting the ability of a client to access the centralized object server to retrieve objects.

To accomplish the above objects, there is provided a method for storing and managing objects in a digital library system including a plurality of clients, an object server for storing an object, a cache server for storing an instance of said object, and a centralized server for storing information identifying said object as being stored in said object server and associating one or more of said plurality of clients with said cache server, the method comprising the steps of:

a) one of the plurality of clients as a requesting client requesting retrieval of an object;

b) sending a copy of said object requested in step a) from said cache server to said requesting client if said object is present in said cache server;

c) sending a copy of said object requested in step a) from said object server to said requesting client if said object is not present in said cache server; and d) sending a copy of said object requested in step a) from said object server to said cache server after said object server sends said object from said object server to said client in step c).

To also accomplish the above objects, there is provided a system for storing and managing objects, comprised of a plurality of clients; an object server for storing an object; a cache server for storing an instance of said object; a centralized server for storing information identifying said object as being stored in said object server and associating one or more of said plurality of clients with said cache server, wherein when one of said plurality of clients as a requesting client requests said centralized server for retrieval of said object said cache server sends an instance of said object to said requesting client if said object is stored in said cache, otherwise said object server sends an instance of said object to said requesting client.

To further accomplish the above objects, there is provided a method for storing and managing objects in a digital library system including a plurality of clients, an object server for storing an object, a cache server for storing an instance of said object, and a centralized server for storing information identifying said object as being stored in said object server and associating one or more of said plurality of clients with said cache server, the method comprising the steps of:

a) a first one of the plurality of clients as a first requesting client requesting retrieval of an object to the cache server;

b) sending a copy of said object requested in step a) from said object server to said cache server;

c) a second one of the plurality of clients as a second requesting client requesting retrieval of said object sent to the cache server in step b); and d) sending a copy of said object requested in step c) from said cache server to said second requesting client in response to said request in step c).

BRIEF DESCRIPTION OF THE DRAWINGS

The above and other objects and advantages of the invention will becomes more apparent and more readily appreciated from the following detailed description of the preferred embodiments of the invention taken in conjunction with the accompanying drawings, of which:

FIG. 3 is a diagram showing data flows in a conventional digital client/server library system;

DETAILED DESCRIPTION OF THE PREFERRED EMBODIMENTS

Figure 1:
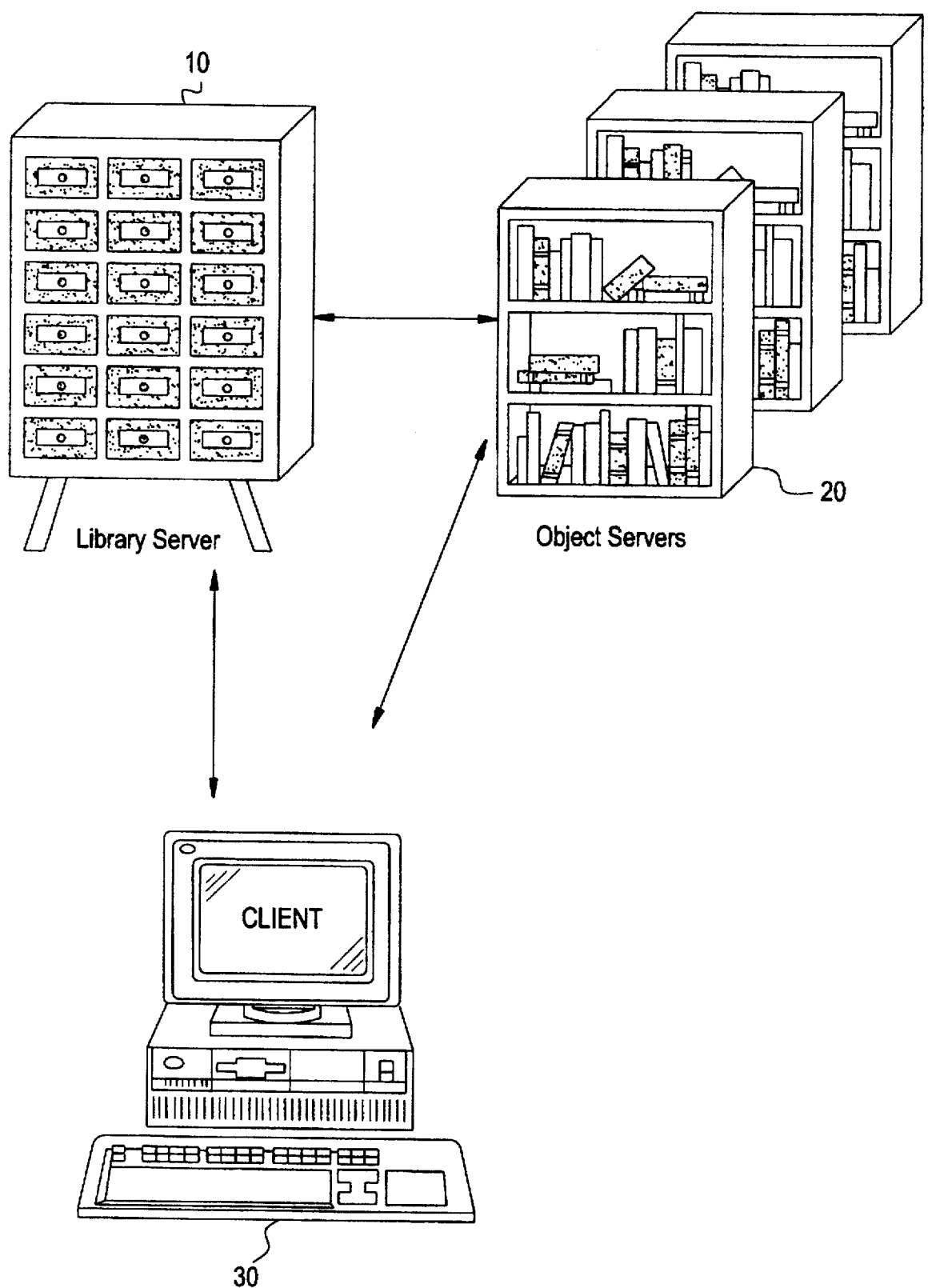
FIG. 1 is a diagram showing a conceptual model of a conventional digital client/server library system.

The embodiments of the present invention are described below in more detail with reference to the above drawings, in which like reference numerals refer to the same or similar elements.

CACHE SERVER

Figure 4:
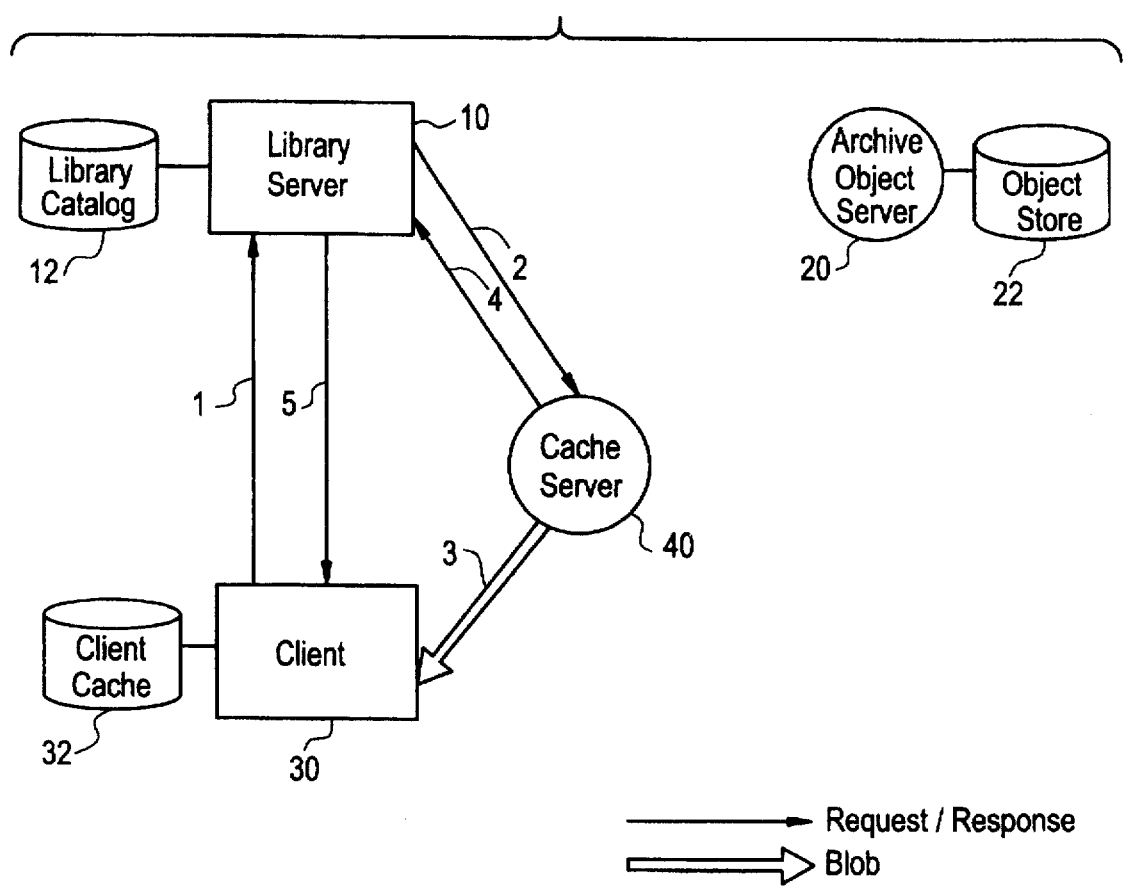
FIG. 4 is a diagram showing data flows in retrieving an object from a cache server according to the present invention.

The present invention includes, in addition to the library server 10, one or more object servers 20 and one or more clients 30 as in the conventional digital client/server library system, a cache server 40 as shown in FIG. 4. Preferably cache server 40 is located in close proximity, e.g., at the same site, to client 30 and can be connected to client 30 via a high-speed connection such as a local area network (LAN). The cache server is also connected to the library server and object servers via the same or a similar network as the client. For instance, cache server 40 can be connected to library server 10 and object server 20 via a WAN. Here, the conventional object servers are referred to as archive object servers since they generally store archival or permanent copies of objects held in the library system, in contrast to a cache server which stores only temporary copies of objects stored in an archival object server.

Information about each object, or blob, stored in the digital client/server library system is stored in the library catalog 2 as in the conventional library system. However, when a cache server is included in t digital client/server library system, the library catalog 22 also includes two control flags, each related to the cache server. A global flag indicates whether caching in cache servers is provided at all in the digital client/server library system. If the global flag is sets caching is enabled for the entire library system. However, if the global flag is not set, then no caching is performed in any cache server throughout the system. A local flag indicates whether a specific cache server is enabled. If the local flag is set for a specific cache server then tat cache server is included in a pole of enabled cache servers, and it performs caching as discussed below. However, if the local flag is not set then that specific cache server is removed from the cache server pool and it does not perform caching. For a cache server to be enabled both the global flag and the local flag for that cache server must be set, both of which can be set by a system administrator. The local flag can be tuned off to prevent caching in a particular cache server in situations where caching would produce counterproductive effects. For example, where only a single client is located at a site with no local object server, caching at a remote object server would not likely provide beneficial results with regard to use of network resources. Likewise, if a patron is located remotely from that patron's default object server, caching could be counterproductive. Accordingly, disabling a particular cache server in these situations could be desirable.

The library catalog does not store information identifying objects that are stored in a cache server. However, the library catalog does store information relating a patron to a default cache server. Accordingly, when a patron sends a request to the library server via a client the library server will determine if a cache server is designated and enabled for that patron and if so will first attempt to have the requested blob sent from that cache server to the requesting client. In order to uniquely identify the object stored in the cache server, an identifier that is unique to the object is stored for that object in the library catalog. In a preferred embodiment of the present invention, for each object stored in the cache server a timestamp is stored in the cache server which identifies the time the object was created or last modified. This timestamp along with a name of the object provides the unique identifier employed by the cache server to identify the object stored in the cache server. Although the library server does not keep track of the specific objects stored in the cache server, the library timeserver does send the timestamp for the requested object in a request sent to the cache server. The cache server uses the timestamp sent by the library server to determine the validity of an object stored in the cache server that matches the name of the requested object. That is, if the name and timestamp of the object stored in the cache server matches the name and timestamp sent in the request from the library server, then the cache server determines that object stored in the cache server is valid.

The cache server is preferably implemented from a LAN based object server (LBOS) in which the staging area is used for cache, although the cache server can be separate from an object server. Thus, when the cache server requests a copy of an object from an archive object server it keeps that copy of the object in the staging area and does not migrate it to permanent storage, such as onto an optical storage medium. Accordingly, the library server 10 need not know of the specific object cached in the staging area of the LBOS.

Alternatively, a migration scheme can be employed when storing objects to an LBOS in which for objects that are stored in the library via the LBOS a copy of the object is retained in the staging area of the LBOS as a cached copy of the object. Such a migration scheme can be implemented, for example, by an application program or via IBM's SMS™, in which an object is copied to an archive object store while an instance of the object is left in the cache server.

Furthermore, storage space in the cache server can be periodically made available by employing an aging process, such as a least recently used algorithm, to remove objects from the cache. Accordingly, as a person of ordinary skill in the art would understand, well known methods for keeping track of references of objects can be employed to implement such an aging scheme.

Figure 2A:
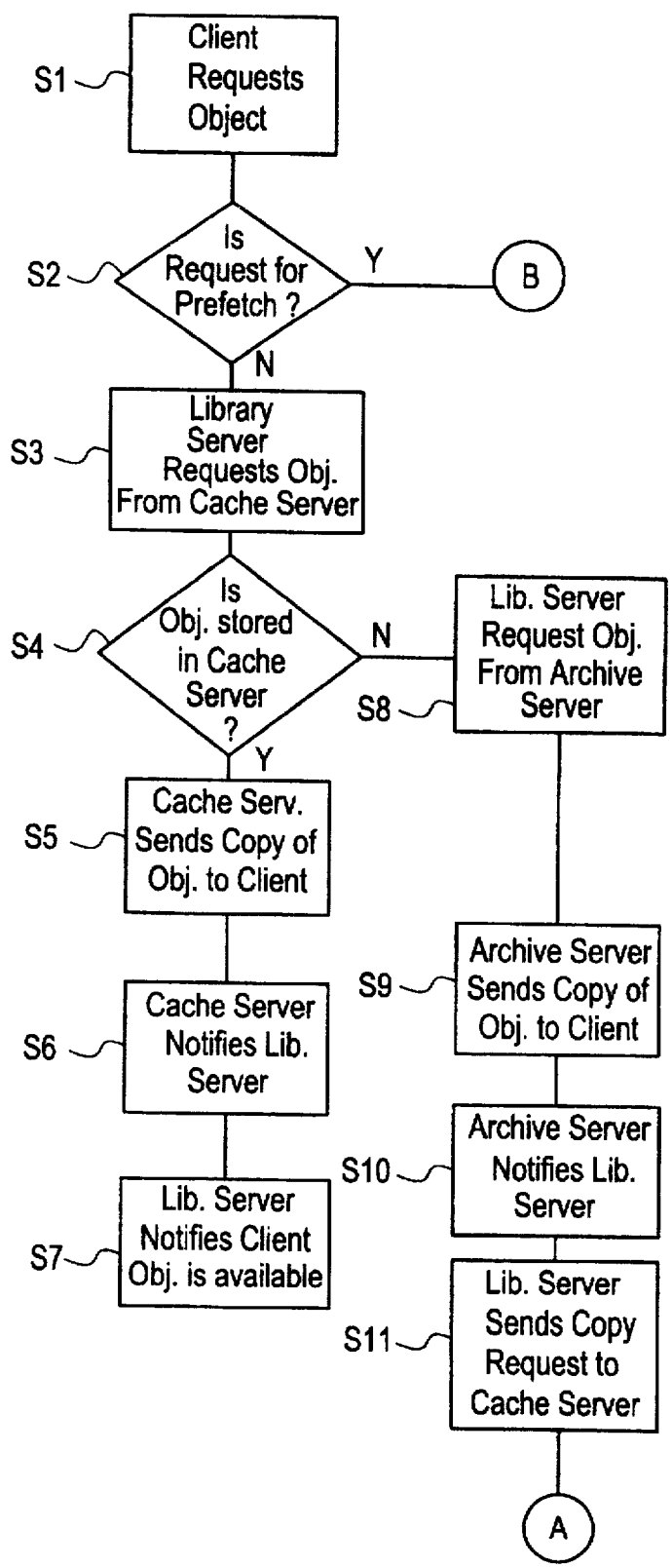
FIGS. 2A–2C are flowcharts showing a method for retrieving objects in a digital library according to the present invention.
Figure 2B:
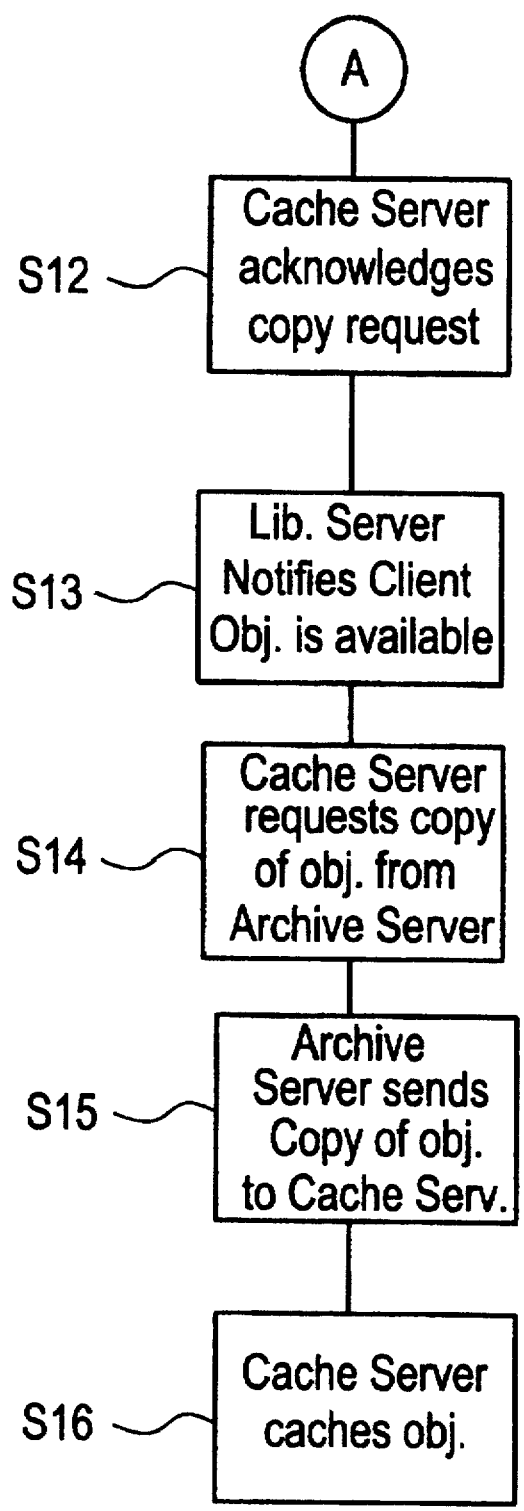
Figure 2C:
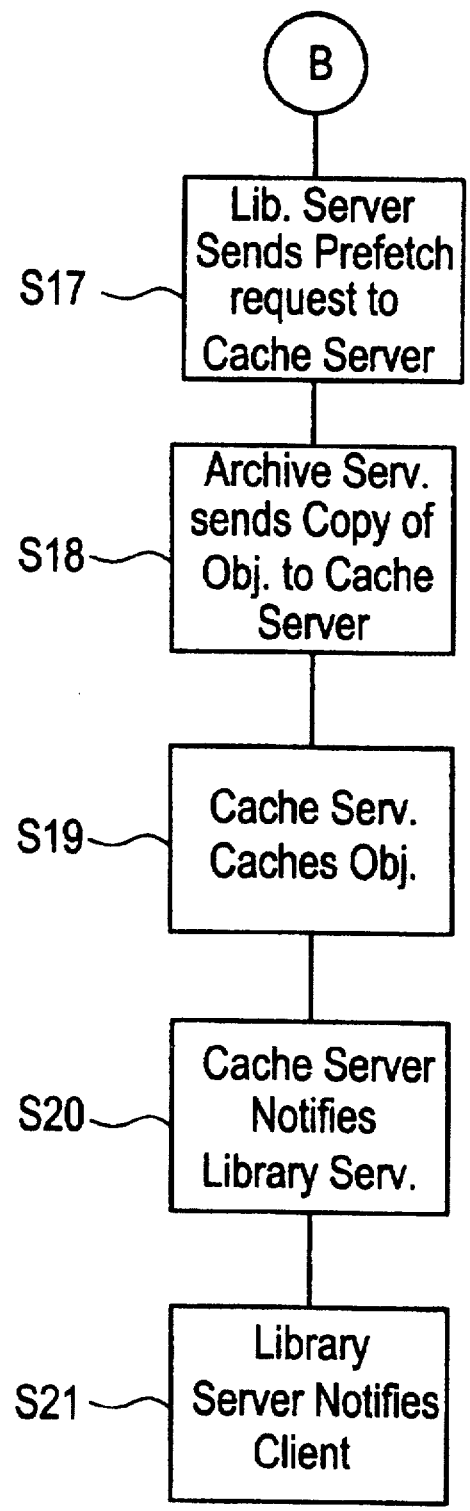

A flowchart is shown in FIGS. 2A–2C which depicts the method according to the present invention of retrieving blobs in a digital client/server library system which includes a cache server such as cache server 40 shown in FIG. 4. This flowchart assumes that the global flag and the local flag for cache server 40 are set.

As shown in FIG. 2A, when a client 30 requests an object, it sends a request 1 to library server 10 as shown in FIG. 4 (step S1). The library server determines if the request is a request for a pre-fetch operation (step S2). A pre-fetch operation is one in which an object is requested to be sent to cache server 40 but not immediately delivered to client 30, rather it is stored in the cache server for delivery to the client at a later time. The pre-fetch operation is discussed later in further detail.

If the request from requesting client 30 is not for a pre-fetch operation then library server 10 sends a request to cache server 40 to send the object to client 30 if the requesting client 30 is associated in the library catalog 12 with cache server 40 (step S3). Otherwise, the library server 10 sends a request for retrieval of the object to the owning archive object server and the object is retrieved as in the conventional library system. The request to cache server 40 includes the name of the object requested by the client and the timestamp of the object stored in the archive object server. A timestamp is stored in library catalog 12 for each object in the library system. Library server 10 sends this request to cache server 40 only if the global flag and the local flag for that cache server are set and if the patron using client 30 is designated within library catalog 12 to have cache server 40 designated as its default object server. Assuming that the patron using client 30 is designated to access cache server 40 and both the global flag and local flag for cache server 40 are enabled, then library server 10 sends the request to cache server 40.

Upon receiving request 2, cache server 40 determines if the requested object is present in cache server 40 (step S4). If a copy of the requested object is present in cache server 40 and the timestamp in the request matches the timestamp of the copy of the object stored in cache server 40 then there is a "cache hit" and cache server 40 sends a copy of the requested object, or blob, 3 to client 30 (step S5). Upon successful transfer of the blob, cache server 40 sends a response 4 back to library server 10 to notify it that the blob was copied to client 30 (step S6). Upon receiving notification that the transfer was successful, library server 10 sends a response 5 to client 30 indicating that the requested blob is stored in client cache 32 for access by the client (step S7). Upon receiving response 5 an application program running in client 30 can retrieve the blob from the client cache 32 giving the application access to the blob.

Figure 5:
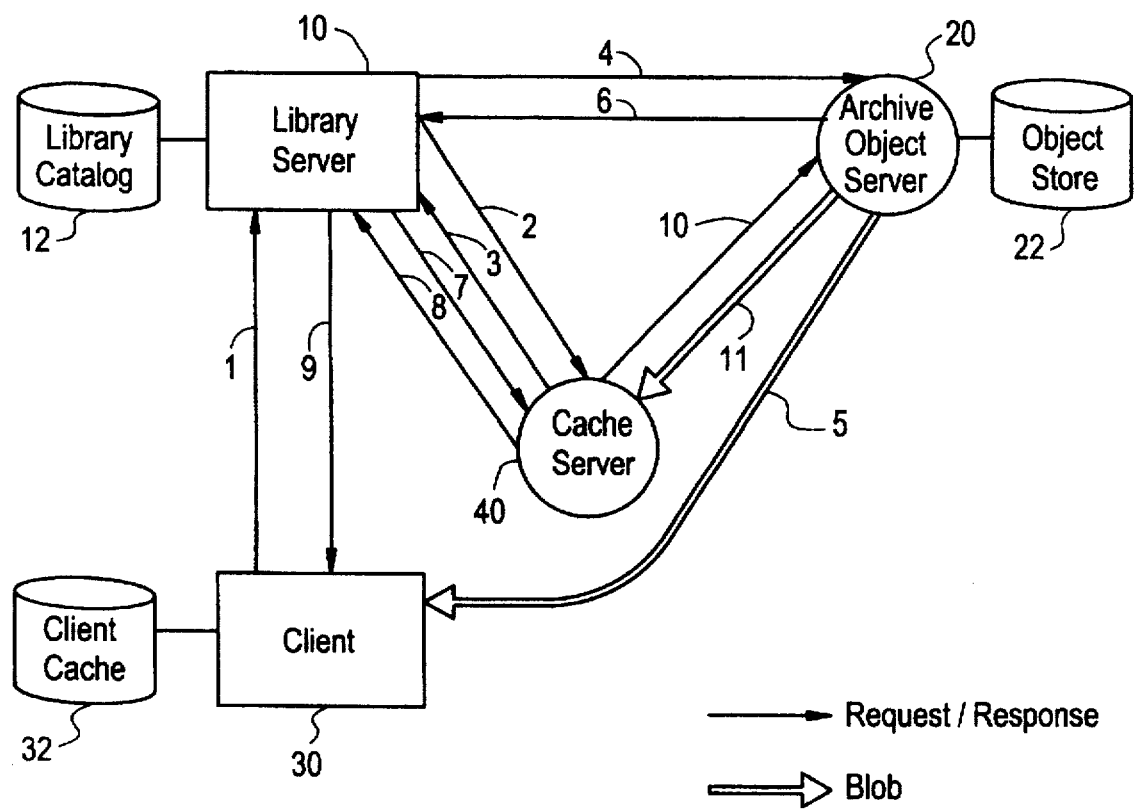
FIG. 5 is a diagram showing data flows in retrieving an object which is not stored in the cache server, according to the present invention.

If, however, the requested blob is not present in cache server 40, that is if there is a "cache miss," then cache server 40 returns a response 3 to library server 10, as shown in FIG. 5, indicating that the requested blob is not present in cache server 40. Library server 10 then sends a request 4 to archive object server 20 which owns the requested object, as defined in the library catalog 12 (step S8). Archive object server 20 sends a copy of the requested blob 5 to client 30, placing it in the client cache 32 (step S9). Upon successful transfer of the blob, archive object server 20 sends a response 4 back to library server 10 notifying it that the blob was transferred (step S10).

In order to populate cache server 40, library server 10, upon transfer of the blob 5 to the client, sends a request 7 to cache server 40 to copy the requested blob from archive object server 20 to cache server 40 (step S1). The request includes an identifier of the object and an identifier of the archive object server which owns the object. Cache server 40 then acknowledges the request by sending a response 8 back to library server 10 (step S12). Upon library server 10 receiving response 8, it sends a response 9 to client 30 notifying it that the blob has been transferred to client cache 32, thereby allowing client access to the blob (step S13).

In response to request 7 from library server 10, cache server 40 sends a request 10 to archive object server 20 requesting a copy of the requested blob that was transmitted to client 30 be sent to cache server 40 (step S14). Archive object server 20 then sends a copy of the requested blob 11 to cache server 40 (step S15), which is stored at cache server 40 (step S16). Accordingly, cache server 40 becomes populated allowing future retrievals of the blob by clients which have access to that cache server, that is, typically clients which are co-located with that cache server. In other words, the expensive and time consuming operations of sending a blob over a WAN are reduced because a cache server preferably is located in close proximity to the clients requesting retrieval of the blob. Accordingly, transmission costs and response time for delivery of the blob to requesting clients is reduced because the blob is transmitted over the WAN only one time rather than each time a client requests it. For subsequent requests by clients serviced by the cache server, which typically are located in the general vicinity as the cache server (e.g., in the same building) the blob is transmitted over the high-speed connection, such as a LAN, rather than over the lower speed and more costly WAN. This is because the library server will first direct requests for that blob to the cache server before sending a request to an archive object server which may be at a location remote to the client.

PRE-FETCH

Figure 6:
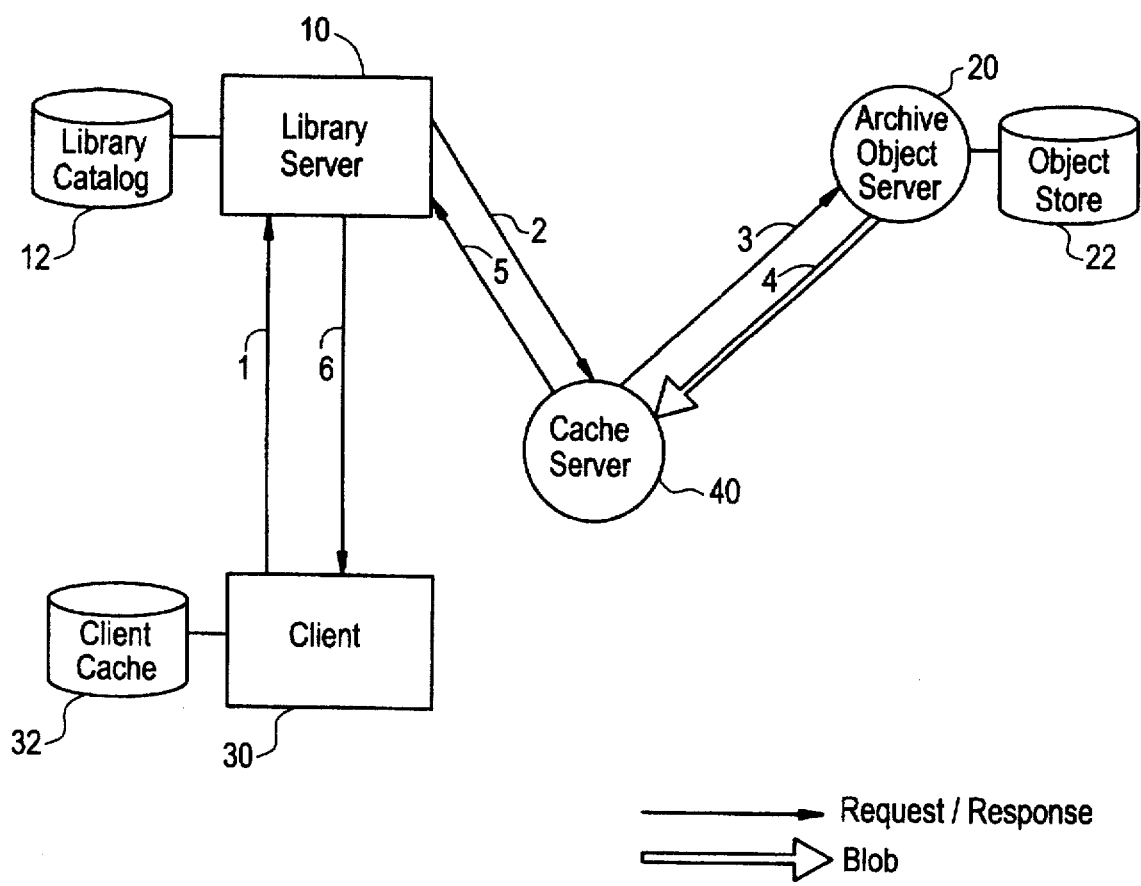
FIG. 6 is a diagram showing data flows in a pre-fetch operation to populate the cache server, according to the present invention.

In another embodiment of the present invention a pre-fetching operation can be performed as shown in the flow-charts of FIGS. 2A and 2C. Data flows for a pre-fetching operation are shown in FIG. 6. In this embodiment a client 30 sends a request 1 to library server 10, in which request 1 indicates that a prefetch operation is to be performed so that a blob will be fetched into cache server 40 for later access by the client (step S1). If library server 10 recognizes that request 1 indicates a pre-fetch operation (step S2) it sends a request 2 to cache server 40 to retrieve the requested blob from archive object server 20 in which the request indicates the blob is to be pre-fetched. Accordingly, cache server 40 sends a copy request 3 to archive object server 20 (step S17). A copy of the requested blob 4 is then sent from archive object server 20 to cache server 40 (step S18) where it is stored and held for access by client 30 (step S19). Cache server 40, upon receiving the blob, sends a response 5 to library server 10 in order to notify it that the blob has been received and stored in the cache server (step S20). Library server 10 then notifies client 30 by sending a request 6 indicating that the pre-fetch operation is complete (step S21).

An example of a use of the pre-fetch operation is for transmitting over a WAN one or more blobs to the cache server during a time when transmission costs and traffic across the WAN are low. Moreover, response time is improved by fetching a copy of the blob during times when network use is low, in anticipation of the user needing access to it, before a user actually needs access to the blob. Accordingly, a cache server 40 could be populated during off-peak-hours to minimize costs and to maximize efficiency if the need for specific objects are known in advance. For instance, an insurance claim adjuster could request, via an application program, digital insurance claim documents on the afternoon of the day before the claim adjuster needs access to them. The client 30, in response to a particular event or condition such as a specific time of day (e.g., 1:00 am) could send requests to library server 10 indicating that those digital documents are to be pre-fetched to cache server 40. Copies of those blobs would then be sent to the cache server during the early hours of the morning when traffic over the network is light and transmission costs are less expensive than during peak hours. The next morning when the claim adjuster is ready to work on that day's insurance claims, copies of the needed documents would already be stored in the cache server and available for use due to the pre-fetching operation performed hours earlier.

ELIMINATION OF CLIENT CACHE

In yet another embodiment of the invention cache server 40 is used in an environment where client 30 does not contain a client cache 32. That is, cache server 40 operates to store blobs without the need for a large number of resources at client 30, needed for a client cache (e.g., a hard disk or a large amount of memory).

The conventional digital client/server library system employs a file based client cache 32 which provides a persistent information store. In this embodiment a file based cache is not needed in client 30, but rather a shared memory storage arrangement, such as a shared memory buffer which is not a persistent store, can be used in order to receive the blob from either archive object server 20 or cache server 40. By using a shared memory storage arrangement instead of a file based client cache the number and amount of resources required at the client is reduced. However, in a client using only a shared memory arrangement the number of objects that can be practically stored at the client is much less than for a client having a file based client cache. Accordingly, the number of blobs that can be stored in a client having only a shared memory arrangement is much more limited than for a client having a file based client cache. In this embodiment, when an archive object server 20 or cache server 40 sends a blob to client 30 having only a shared memory buffer and no client cache, the blob is stored in a shared memory buffer. The shared memory buffer contains a header identifying a set of elements which describe the entries in the shared memory buffer. These elements in the header have a structure that is similar to that used in the client cache. Accordingly, when library server 10 sends a response to client 30 indicating that the blob is available to the client, that response contains a handle to the blob stored in the shared memory buffer so that the client can search the header for the identifier of the blob and then access it via the shared memory buffer.

By eliminating the client cache 32 the required resources for the client are reduced in this embodiment of the invention. Although, a cache server 40 can be employed to maintain local storage of blobs from which the client can request the blob and receive a copy of it with little delay. A quick response time can be achieved by limiting the transmission of the blob over a very short distance, for example, over a local area network (LAN). Thus, by employing a cache server on the same LAN to which the client is connected allows the client quick access to the blob without requiring that each client maintain a client cache 32. This embodiment also reduces the required resources needed across the library system since blobs are maintained at a single cache server 40 instead of in the individual client caches 32 of the clients serviced by that cache server. Accordingly, each client need not keep a copy of a blob which is commonly used among more than one client at a site. That is, by storing only a single copy of the blob in a cache server rather than storing multiple copies, one at each client connected to the LAN, the amount of required resources is reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

An example of such a modification is for an LBOS, on which a cache server is implemented, to have separated cache and staging areas in which cache server activities would occur on one volume and processing of objects owned by the LBOS, in its archive object server role, would occur on another volume. Further, multiple volumes for use as a caching area can be supported. For example, objects can be partitioned among multiple cache server volumes based on the first character in the object's identifier. Here, for a character space of 26 (i.e., "A"–"Z"), the first character could be normally randomized in an identifier, or itemid generation algorithm. Hence, a simple computation of (objectname[0]-"A")/(round (26/number_of_volumes), would yield the target volume identifier for storing and retrieving objects. As an example, a storage area consisting of 3 volumes would give: round(26/3)=9. Accordingly, an object having "A" as the first character in its identifier (i.e., objectname[0]) would have 0/9=0, that is that object would be stored on volume "0". An object having "J" as the first character in its identifier would be placed on volume "1" (i.e., 10/9=1), and an object beginning with the character "Z" would be placed on volume "2" (i.e., 26/9=2). The above modification is only an example of modifications that are possible within the scope and spirit of the invention as set forth in the following claims.

What is claimed is:

1. A method for storing and managing objects in a distributed information storage management system including a plurality of clients, an object server for storing an object, a cache server and a centralized server having information stored therein regarding the location of the object, the plurality of clients and the cache server, the method comprising the steps of:

a) one of the plurality of clients as a requesting client requesting the centralized server for retrieval of the object;

b) sending a copy of the object requested in step a) from the cache server to said requesting client if the object is present in said cache server;

c) sending a copy of the object requested in step a) from the object server to said requesting client if the object is not present in the cache server; and d) sending another copy of the object requested in step a) from the object server to the cache server after step c) begins, wherein steps b), c) and d) are initiated by the centralized server based on the information stored in said centralized server.

2. The method recited in claim 1, wherein the information stored in the centralized server identifies the object as being stored in said object server and associations between one or more of the plurality of clients and the cache server.

3. The method recited in claim 1, wherein the centralized server causes said copy of the object sent to said client to become available for use to said client regardless of whether step d) is completed.

4. The method recited in claim 1, wherein said requesting client includes a client cache which is a persistent data store, and said copy of the object sent to said requesting client in one of steps b) and c) is stored in said client cache.

5. The method recited in claim 1, wherein said requesting client includes a client cache which is a non-persistent data store, and said copy of the object sent to said requesting client in one of steps b) and c) is stored in said client cache.

6. A method for storing and managing objects in a distributed information storage management system including a plurality of clients, an object server for storing an object, a cache server and a centralized server for storing information regarding the location of the object, the object server, the cache server and the plurality of clients, wherein the information stored in the centralized server identifies the object as being stored in the object server and identifies an association between one or more of the plurality of clients and the cache server, the method comprising the steps of:

a) a first one of the plurality of clients as a first requesting client requesting the centralized server for storing a copy of the object in the cache server;

b) sending a copy of the object requested in step a) from said object server to said cache server and storing said copy of the object in the cache server;

c) a second one of the plurality of clients as a second requesting client requesting the central server for retrieving said copy of the object from the cache server, wherein said second requesting client is any one of the plurality of clients associated with the cache server as identified by the information stored in the centralized server; and d) sending said copy of the object requested in step c) from the cache server to said second requesting client in response to the request in step c).

7. A system for storing and managing objects, comprised of:

a plurality of clients;

an object server for storing an object;

a cache server; and a centralized server, wherein when one of said plurality of clients as a requesting client requests said centralized server for retrieval of said object said centralized server directs said cache server to send a copy of said object to said requesting client if an instance of said object is stored in said cache server, otherwise said centralized server directs said object server to send a copy of said object to said requesting client.

8. The system recited in claim 7, wherein said centralized server stores information which identifies said object as being stored in said object server and identifies an association between one or more of said plurality of clients and said cache server, and wherein said centralized server directs said object server and said cache server based on said information stored in said centralized server.

9. The system recited in claim 8, wherein after one of said cache server and said object server begins to send said copy of said object to said requesting client said centralized server directs said object server to send another copy of said object to said cache server if an instance of said object is not stored in said cache server, wherein said centralized server causes said copy of said object sent to said requesting client to become available for use by said client regardless of whether said object server has completed sending the other copy of said object to said cache server.

10. A system for storing and managing objects, comprised of:

a plurality of clients;

an object server for storing an object;

a cache server for storing an instance of said object; and a centralized server for storing information identifying said object as being stored in said object server and associating one or more of said plurality of clients with said cache server, wherein a first requesting client from among said plurality of clients sends a request for said object to said centralized server and in response to said request said centralized server sends a request to said cache server to send a copy of said instance of said object to said first requesting client if said first requesting client is a member of said one or more clients associated with said cache server, otherwise said centralized server sends a request to said object server to send a copy of said object to said first requesting client.

11. The system recited in claim 10, wherein in response to said request sent from said centralized server to said cache server, said cache server sends said copy of said instance of said object to said first requesting client if it is a member of said one or more clients associated with said cache server, otherwise in response to said request sent from said centralized server to said object server, said object server sends said copy of said object to said first requesting client, and said centralized server notifies said first requesting client once said copy of said object is sent by one of said cache server and said object server, and said object becomes available for use by said first requesting client.

12. The system recited in claim 10, wherein when another of said plurality of clients as a second requesting client sends a request to said centralized server for retrieval of another object which is stored in said object server but is not stored in said cache server, said centralized server sends a request to said object server to send a copy of said other object to said second requesting client, said centralized server sends a request to said cache server to retrieve a copy of said object from said object server, and said centralized server notifies said second requesting client once said copy of said other object is sent to said second requesting client, and upon receipt of said notice from said centralized server said copy of said object becomes available for use by said second requesting client, wherein said centralized server sends said notice regardless of whether said cache server retrieves a copy of said other object from said object server.

13. The system recited in claim 10, wherein another of said plurality of clients as a second requesting client sends a request to said centralized server to store in said cache server a copy of another object, and in response to said request from said second requesting client said centralized server sends a request to said cache server to retrieve a copy of the other object from said object server whereupon said object server sends a copy of said other object to said cache server.

14. The system recited in claim 13, wherein yet another of said plurality of clients as a third requesting client sends a request to said centralized server to retrieve a copy of the other object based upon a predetermined condition, whereupon said centralized server sends a request to said cache server which in response thereto sends said copy of said other object to said third requesting client.

15. The system recited in claim 14, wherein said first, second and third requesting clients are the same one of said plurality of clients.

16. The system recited in claim 11, wherein said first requesting client comprises:

a client cache for persistently storing said copy of said object received from one of said object server and said cache server; and a client application program for retrieving said object from said client cache upon receipt of said notice from said centralized server.

17. The system recited in claim 11, wherein said first requesting client comprises:

a non-persistent storage area for storing said copy of said object received from one of said object server and said cache server, wherein upon receipt said copy of said object is stored only in said non-persistent storage area; and a client application program for retrieving said copy of said object from said non-persistent storage area upon receipt of said notice from said centralized server.

18. The system recited in claim 10, wherein when said object server stores another object which is identified in said centralized server as being stored in said object server, said centralized server causes a copy of the other object to be stored in said cache server.

* * * * *

UNITED STATES PATENT AND TRADEMARK OFFICE
CERTIFICATE OF CORRECTION

PATENT NO. : 5,896,506
DATED : April 20, 1999
INVENTOR(S) : Seifu ALI, Thomas G. BURKET, Gerald E. KOZINA, Tawei HU It is certified that error appears in the above-identified patent and that said Letters Patent is hereby corrected as shown below:

<u>Column 6</u>

Line 47, delete "2" and insert --12--;
Line 48, delete "t" and insert --the--;
Line 49, delete "22" and insert --12--;
Line 53, delete "sets" and insert --set--;
Line 58, delete "tat" and insert --that--.

Signed and Sealed this

Twenty-eighth Day of March, 2000

Attest:

Q. TODD DICKINSON

*Attesting Officer*          *Commissioner of Patents and Trademarks*